(12) United States Patent
Su et al.

(10) Patent No.: US 10,691,189 B2
(45) Date of Patent: Jun. 23, 2020

(54) LINE-VOLTAGE DETECTION METHOD, POWER CONTROLLER AND POWER SUPPLY WITH BROWN-OUT PROTECTION AND BROWN-IN MECHANISM

(71) Applicant: Leadtrend Technology Corporation, Zhubei, Hsinchu County (TW)

(72) Inventors: Wei Chuan Su, Zhubei (TW); Meng Jen Tsai, Zhubei (TW)

(73) Assignee: LEADTREND TECHNOLOGY CORPORATION, Zhubei, Hsinchu County (TW)

( * ) Notice: Subject to any disclaimer, the term of this patent is extended or adjusted under 35 U.S.C. 154(b) by 387 days.

(21) Appl. No.: 15/692,636

(22) Filed: Aug. 31, 2017

(65) Prior Publication Data
US 2018/0088651 A1 Mar. 29, 2018

(30) Foreign Application Priority Data
Sep. 26, 2016 (TW) .............................. 105130947 A

(51) Int. Cl.
| | |
|---|---|
| G06F 1/28 | (2006.01) |
| G06F 1/30 | (2006.01) |
| H02H 7/122 | (2006.01) |
| H02H 3/20 | (2006.01) |
| H02H 3/247 | (2006.01) |

(52) U.S. Cl.
CPC ................. *G06F 1/28* (2013.01); *G06F 1/30* (2013.01); *G06F 1/305* (2013.01); *H02H 3/207* (2013.01); *H02H 3/247* (2013.01); *H02H 7/1222* (2013.01)

(58) Field of Classification Search
CPC .. G06F 1/28; G06F 1/305; G06F 1/30; H02H 7/1222; H02H 3/247; H02H 3/207
USPC ............................................... 361/91.1–91.2
See application file for complete search history.

(56) References Cited

U.S. PATENT DOCUMENTS

| | | | | |
|---|---|---|---|---|
| 7,486,493 B2 * | 2/2009 | Yang | ................. | H02M 3/33507 361/91.1 |
| 2009/0161287 A1 * | 6/2009 | Kandah | .................... | H03K 5/08 361/263 |

* cited by examiner

*Primary Examiner* — Dharti H Patel
(74) *Attorney, Agent, or Firm* — McClure, Qualey & Rodack, LLP

(57) ABSTRACT

A power controller makes use of a line-voltage detection method to perform brown-out protection and brown-in mechanism. The power controller has a high-voltage node connected via a current-limiting resistor to a line voltage, and a high-voltage startup transistor connected to the high-voltage node. The input voltage at the high-voltage node is divided to provide a fraction result. An offset current flowing through the high-voltage startup transistor and the current-limiting resistor is provided in response to the fraction result. The offset current is stopped in response to the fraction result when the offset current flows through the high-voltage startup transistor and the current-limiting resistor.

20 Claims, 3 Drawing Sheets

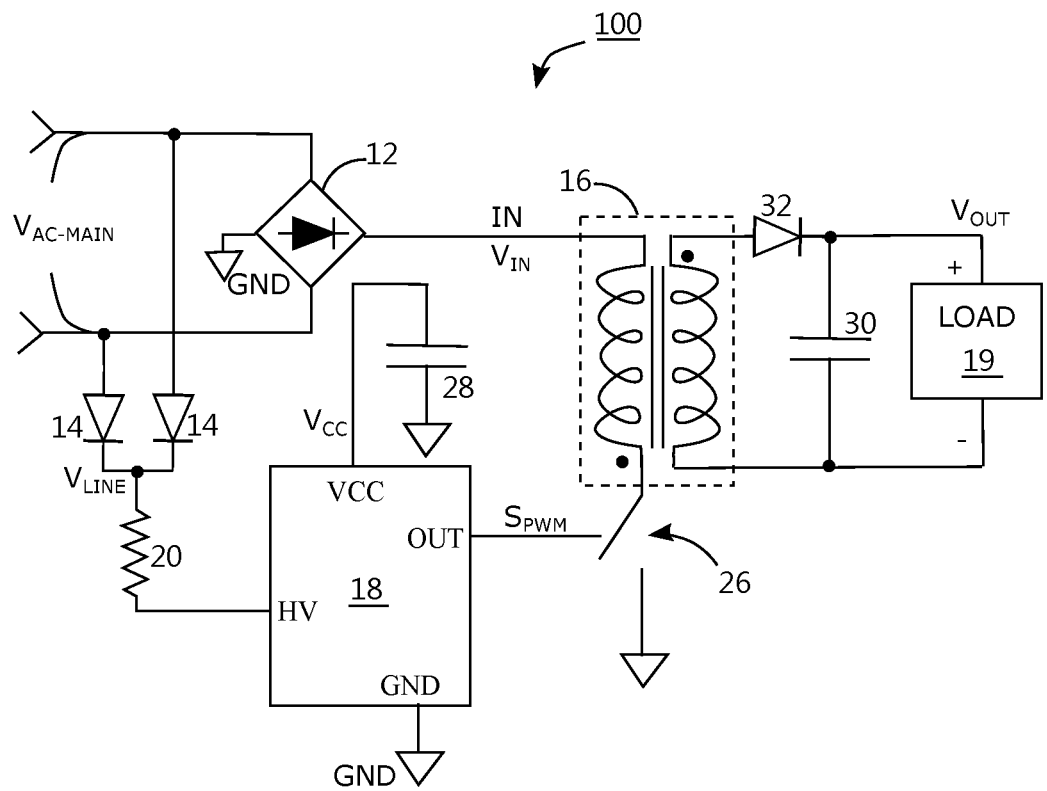
FIG. 1 (PRIOR ART)
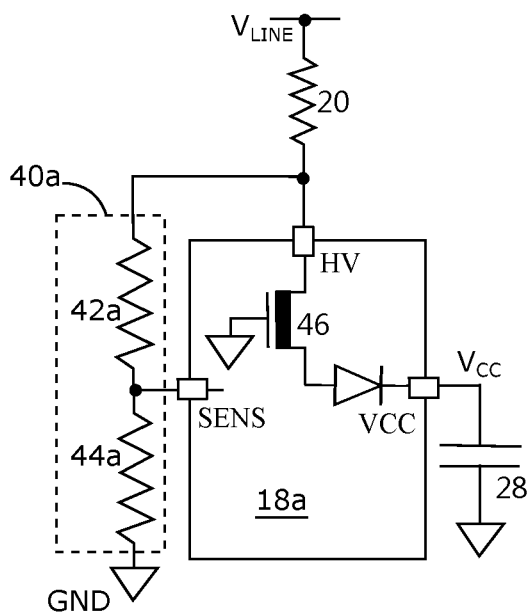
FIG. 2A (PRIOR ART)
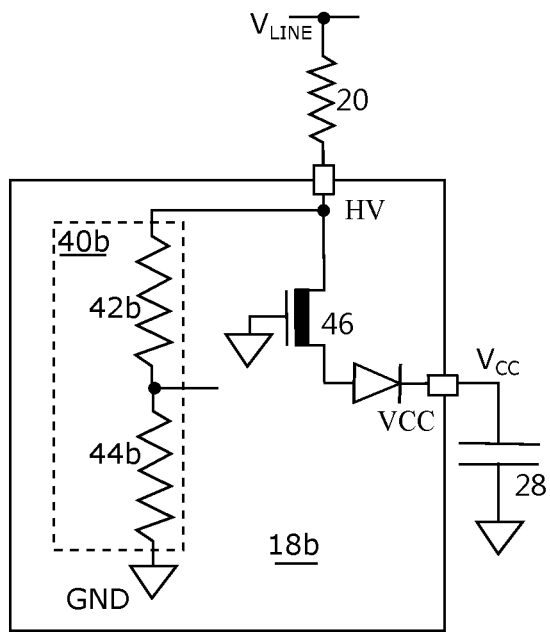
FIG. 2B (PRIOR

US 10,691,189 B2

LINE-VOLTAGE DETECTION METHOD, POWER CONTROLLER AND POWER SUPPLY WITH BROWN-OUT PROTECTION AND BROWN-IN MECHANISM

CROSS-REFERENCE TO RELATED APPLICATION

This application claims priority to and the benefit of Taiwan Application Series Number 105130947 filed on Sep. 26, 2016, which is incorporated by reference in its entirety.

BACKGROUND

The present disclosure relates generally to a line-voltage detection method for a power controller with high-voltage startup, and more particularly to brown-out protection and brown-in mechanism of a power controller with high-voltage startup.

A line voltage normally refers to the voltage generated by rectifying an alternating-current (AC) voltage from a power grid, it is a direct-current voltage (DC), and its value always provides important information to AC-to-DC power supplies or converters. For example, when a line voltage sags, a power supply powered by the line voltage might need to stop its power conversion, otherwise disasters could happen due to malfunction caused by the sag. This kind of protection is known as brown-out protection. In the other hand, based upon the detection or a line voltage recovering from sagging, a power supply equipped with brown-in mechanism could resume its power conversion automatically and supply power to its load properly. Furthermore, the awareness of the value of a line voltage could be used to compensate outcomes of a power supply that are otherwise influenced by the line voltage.

FIG. 1 demonstrates an AC-to-DC power supply 100 with a flyback topology. Bridge rectifier 12 provides to an AC voltage $V_{AC-MAIN}$ from a power grid full-wave rectification to generate input voltage $V_{IN}$ at input node IN. Power controller 18, normally a packaged integrated circuit with 40 pins, provides pulse-width modulation (PWM) signal $S_{PWM}$ to control power switch 26, which in response controls a current flowing through transformer 16. When the power switch 16 is turned ON, transformer 16 energizes; and when it is turned OFF, transformer 16 de-energizes to, via diode 32, buildup output voltage $V_{OUT}$ over output capacitor 30 that powers load 19.

Diodes 14 together perform half-wave rectification to generate line voltage $V_{LINE}$. Power controller 18 has a pin, named high-voltage node HV hereinafter, connected to line voltage $V_{LINE}$ via current-limiting resistor 20. Power controller 18 is equipped with high-voltage startup technology. When AC-to-DC power supply 100 is just connected to the AC voltage $V_{AC-MAIN}$, a high-voltage startup procedure commences, power controller 18 pulls a charging current from high-voltage node HV, this charging current is directed to go through operating voltage source node VCC and charge operating voltage capacitor 28, so operating voltage $V_{CC}$ is built. Once operating voltage $V_{CC}$ is high or good enough, the high-voltage startup procedure concludes, the charging current stops, and power controller 18 starts providing PWM signal $S_{PWM}$.

FIG. 2A shows power controller 18a that detects line voltage $V_{LINE}$ and is capable of performing brown-out protection. Power controller 18a could replace power controller 18, and has a high-voltage startup transistor 46, which is turned ON during the high-voltage startup procedure to provide the charging current charging operating voltage capacitor 28. External to power controller 18a, connected between high-voltage node HV and ground line GND is voltage divider 40a consisting of resistors 42a and 44a. A joint node between resistors 42a and 44a is connected to sense node SENS of power controller 18a and provides to power controller 18a fraction result of line voltage $V_{LINE}$. The architecture shown in FIG. 2A provides flexibility to power supply system designers, who could easily change brown-out and brown-in references for brown-out protection and brown-in mechanism by selecting different resistances of resistors 42 and 44. Brown-out reference means the reference voltage for line voltage $V_{LINE}$ to goes below and to trigger brown-out protection; brown-in reference means the reference voltage that line voltage $V_{LINE}$ must exceed to start brown-in mechanism.

In view of bill-of-materials (BOM) cost, that architecture in FIG. 2A is expensive however, because resistors 42 and 44 are two discrete components that require extra storage management and device assembling. Furthermore, power controller 18a need dedicate an additional pin, which is sense node SENS.

Another detection method for line voltage $V_{LINE}$ is to embed voltage divider 40a of FIG. 2A in a power controller, as demonstrated by power controller 18b in FIG. 2B. In comparison with power controller 18a of FIG. 2A, power controller 18b in FIG. 2B has embedded voltage divider 40b inside itself, and requires no pin for sense node SENS. A power supply based on power controller 18b could be cheaper, but possibly in the expenses of the flexibility to the modification of brown-out and brown-in references. Power supply system designers could not change the brown-out and brown-in references for brown-out protection and brown-in mechanism once the power controller 18b is fabricated.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein:

FIG. 1 demonstrates an AC-to-DC power supply with a flyback topology in the art;

FIGS. 2A and 2B shows two power controllers in the art;

DETAILED DESCRIPTION

Figure 3:
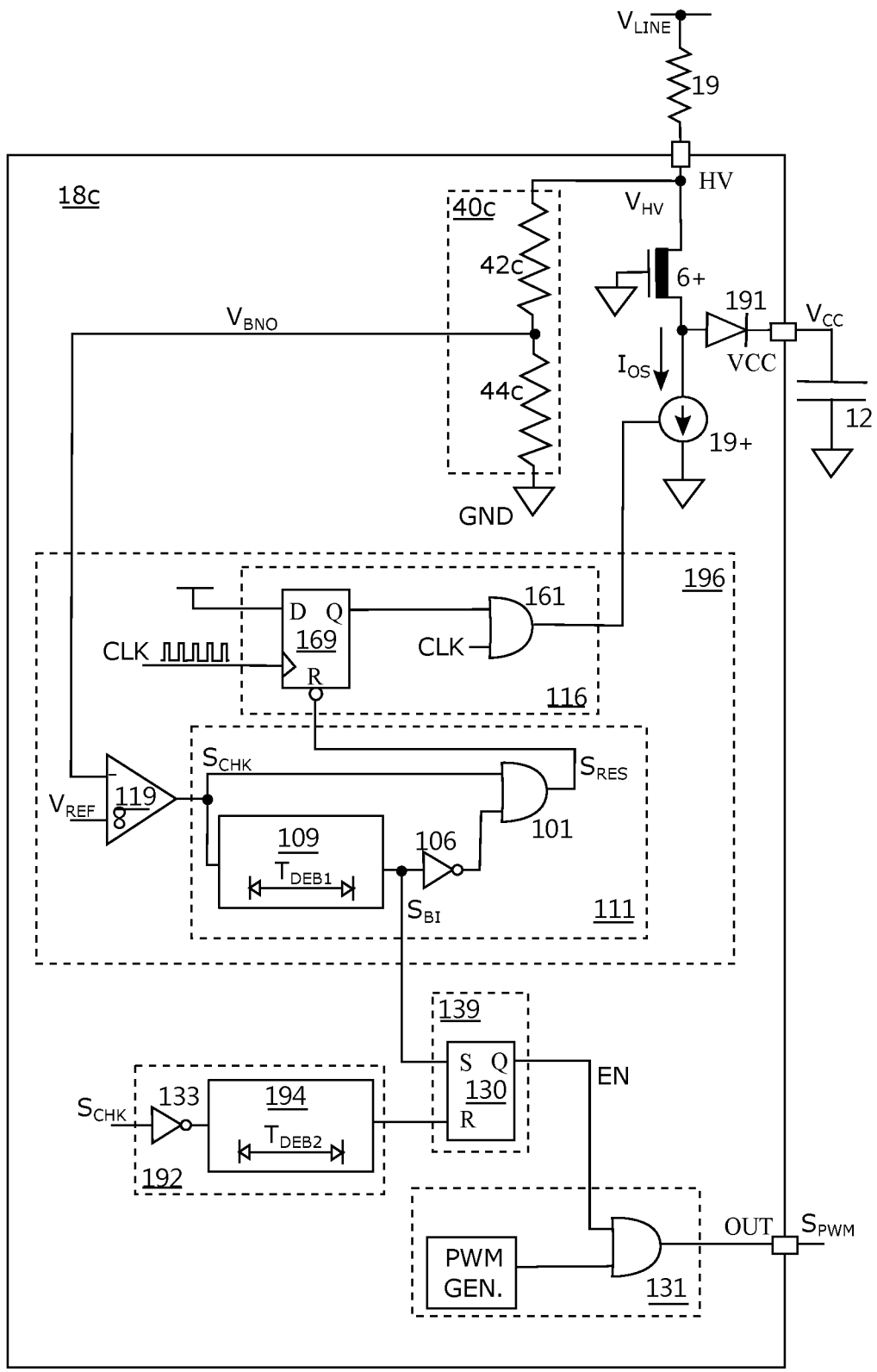
FIG. 3 demonstrates a power controller according to embodiments of the invention.

FIG. 3 demonstrates a power controller 18c according to embodiments of the invention. Power controller 18c could be in form of a packaged integrated circuit and capable of replacing power controller 18 in FIG. 1 to provide PWM signal $S_{PWM}$ and control power switch 26 according to embodiments of the invention.

Inside power controller 18c is a high-voltage startup transistor 46 connected to high-voltage node HV, which could be a pin of a packaged integrated circuit. For instance, high-voltage startup transistor 46 is a depletion-mode metal-oxide-semiconductor (MOS) transistor, or a depletion-mode junction field effect transistor (JFET), capable of sustaining a drain-to-source voltage more than 400V, or as high as 800V. During a high-voltage startup procedure, power switch 26 is constantly turned OFF, and high-voltage startup transistor 46 is ON to conduct a charging current charging operating voltage capacitor 28 via diode 202 and operating voltage source node VCC, so operating voltage $V_{CC}$ rises. Operating voltage source node VCC could be a pin of power controller 18c if power controller 18c is in form of an integrated circuit. When operating voltage $V_{CC}$ exceeds a predetermined level, 20 volt for example, the high-voltage startup procedure concludes, high-voltage startup transistor 46 is turned OFF, probably because of the rise in the source voltage of the high-voltage startup transistor 46, and the charging current stops. Operating voltage $V_{CC}$ is the power source that power controller 18c relies on for normal operations. As shown in FIG. 3, high-voltage startup transistor 46 has its drain connected to line voltage $V_{LINE}$ via high-voltage node HV and current-limiting resistor 20. After high-voltage startup procedure concludes, PWM signal $S_{PWM}$ could be generated to turn ON and OFF power switch 26.

Power controller 18c includes controllable current source 206, voltage divider 40c, management circuit 204, a brown-out protection circuit 208, brown-in mechanism circuit 210 and signal generator 212.

Voltage divider 40c includes two resistors 42c and 44c connected in series between high-voltage node HV and ground line GND. The joint between resistors 42c and 44c can feed fraction result $V_{BNO}$ of the input voltage $V_{HV}$ at high-voltage node HV to management circuit 204, which in response controls controllable current source 206. In other words, voltage divider 40c divides input voltage $V_{HV}$ at high-voltage node HV to provide fraction result $V_{BNO}$ which is substantially in proportion to input voltage $V_{HV}$.

Management circuit 204 could turn ON controllable current source 206, which accordingly pulls an offset current $I_{OS}$, whose value is IOS, a positive number. Offset current $I_{OS}$ flows from line voltage $V_{LINE}$, through current-limiting resistor 20, high-voltage node HV, high-voltage startup transistor 46, and controllable current source 206, and to ground line GND. When controllable current source 206 is turned OFF, offset current $I_{OS}$ is about 0 A or disappears. Controllable current source 206 could be forbidden to be turned ON until a high-voltage startup procedure concludes or operating voltage $V_{CC}$ is high enough.

As demonstrated in FIG. 3, management circuit 204 comprises comparator 220, single pulse generator 222, and control circuit 224. Comparator 220 compares fraction result $V_{BNO}$ with a reference voltage $V_{REF}$ to generate a comparison result $S_{CHK}$. Comparison result $S_{CHK}$ is "1" in logic if fraction result $V_{BNO}$ exceeds reference voltage $V_{REF}$, or it is "0" in logic otherwise. When comparison result $S_{CHK}$ turns from logic "0" into logic "1", it is possible for single pulse generator 222 to provide a pulse signal $S_{RES}$. If pulse signal $S_{RES}$ does not exist, staying at logic "0" all the time, control circuit 224 keeps controllable current source 206 OFF. Only if pulse signal $S_{RES}$ has logic value of "1", can control circuit 224 allow clock signal CLK to turn ON controllable current source 206.

Single pulse generator 222 includes debouncing circuit 230, NOT gate 234, and AND gate 232. Debouncing circuit 230 passes comparison result $S_{CHK}$ to be acknowledgement signal $S_{BI}$ if comparison result $S_{CHK}$ has been stable at "1" in logic for a predetermined debounce-time $T_{DEB1}$. According to one embodiment of this invention, acknowledgement signal $S_{BI}$ is "0" in logic if comparison result $S_{CHK}$ is "0" in logic. Acknowledgement signal $S_{BI}$ becomes "1" in logic only if comparison result $S_{CHK}$ has remained as "1" for debounce-time $T_{DEB1}$, which for example is about 300 us. NOT gate 234 and AND gate 232 together work as a logic circuit to generate pulse signal $S_{RES}$ in response to comparison result $S_{CHK}$ and acknowledgement single $S_{BI}$.

Control circuit 224 receives clock signal CLK and pulse signal $S_{RES}$ to control controllable current source 206. When pulse signal $S_{RES}$ does not exist, being "0" in logic, D flip-flop 240 is reset all the time, keeping its output "0" in logic and turning controllable current source 206 OFF. When pulse signal $S_{RES}$ occurs, being "1" in logic, D flip-flop 240, which is then updated by a flowing rising edge of clock signal CLK, can turn controllable current source 206 ON through AND gate 242. According to one embodiment of the invention, the cycle time of clock signal CLK is about 100 us.

Brown-in mechanism circuit 210 receives acknowledgement signal $S_{BI}$. Acknowledgement signal $S_{BI}$, if it is "1" in logic, sets SR flip-flop 213 to enable signal generator 212, which in response starts providing PWM signal $S_{PWM}$ to turn ON and OFF power switch 26, so power conversion to output voltage $V_{OUT}$ commences.

Brown-out protection circuit 208 receives comparison result $S_{CHK}$, and includes NOT gate 211 and debouncing circuit 209. Debouncing circuit 209 is the same with debouncing circuit 230 in view of functionality, but debouncing circuit 209 has debounce-time $T_{DEB2}$ different from debounce-time $T_{DEB1}$ of debouncing circuit 230, and debounce-time $T_{DEB2}$ is 180 ms according to embodiments of the invention. In other words, when comparison result $S_{CHK}$ has continued to be "0" in logic for 180 ms, brown-out protection circuit 208 resets SR flip-flop 213 to disenable signal generator 212. As a result, signal generator 212 stops providing PWM signal $S_{PWM}$, power switch 26 is kept being OFF, and power conversion to output voltage $V_{OUT}$ ceases.

According to embodiment of the invention, the resistance of current-limiting resistor 20 is about tens of thousands of ohms, and those of resistors 42c and 44c are each about tens of millions of ohms.

Figure 4:
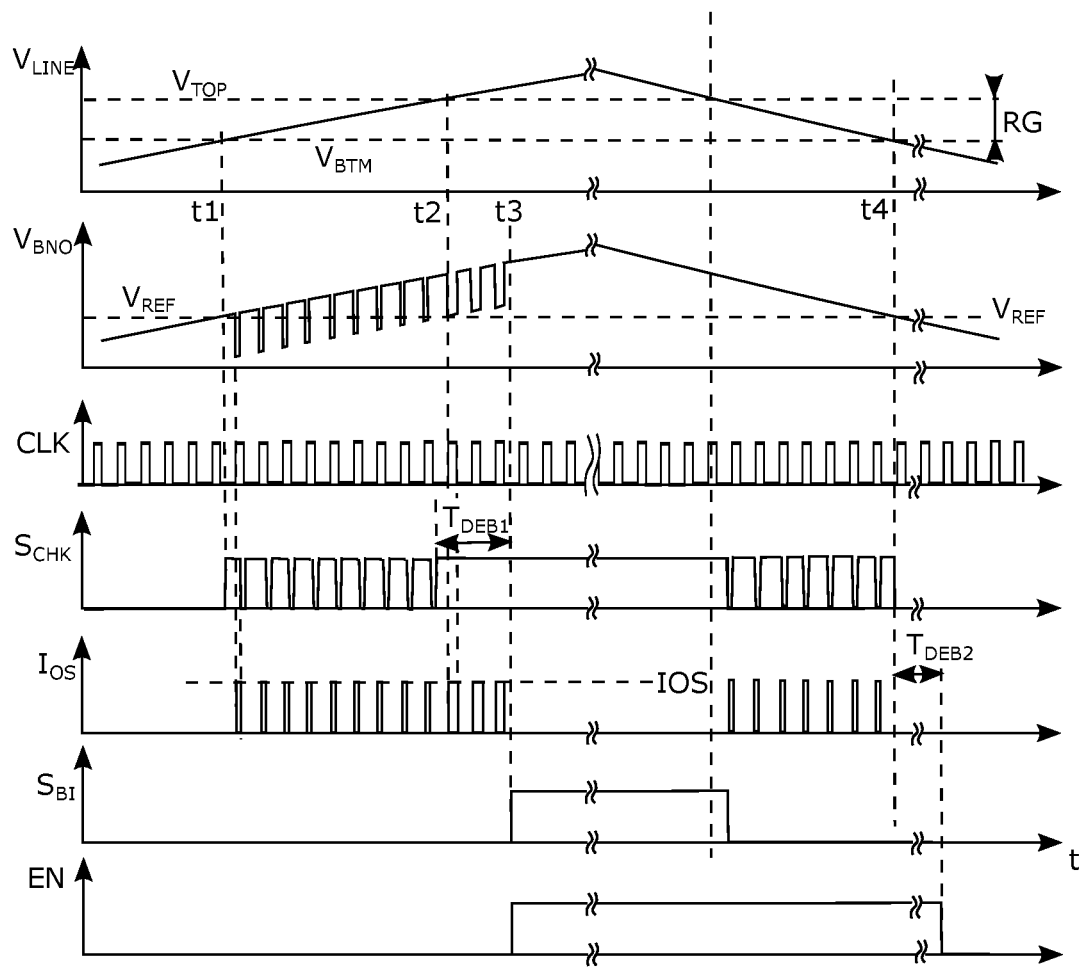
FIG. 4 illustrates signal waveforms of signals in FIG. 3.

FIG. 4 illustrates signal waveforms of signals in FIG. 3, including, from top to bottom, line voltage $V_{LINE}$, fraction result $V_{BNO}$ clock signal CLK, comparison result $S_{CHK}$, offset current $I_{OS}$, acknowledgement signal $S_{BI}$, and enabling signal EN that enables or disenables signal generator 212.

For the front, left half of FIG. 4, line voltage $V_{LINE}$ ramps up slowly and steadily, thriving to show how brown-in mechanism works inside power controller 18c; and for the rear, right half of FIG. 4, line voltage $V_{LINE}$ goes downward constantly, withering to show how brown-out protection is triggered inside power controller 18c.

Before moment t1, offset current $I_{OS}$ is 0 A, line voltage $V_{LINE}$ is under lower limit voltage $V_{BTM}$, and outside a predetermined range RG defined between lower limit voltage $V_{BTM}$ and upper limit voltage $V_{TOP}$. In the meantime, fraction result $V_{BNO}$ being about $K*V_{LINE}$ where K is the fraction defined by voltage divider 40c, is less than reference voltage $V_{REF}$. Acknowledgement signal $S_{BI}$ and comparison result $S_{CHK}$ both are "0" in logic. So pulse signal $S_{RES}$ is "0"

in logic and control circuit 224 turns controllable current source 206 OFF. Offset current $I_{OS}$ is about 0 A, disappearing.

At moment t1, line voltage $V_{LINE}$ goes up beyond lower limit voltage $V_{BTM}$, and starts entering within the predetermined range RG. Meanwhile, fraction result $V_{BNO}$ exceeds reference voltage $V_{REF}$ so comparison result $S_{CHK}$ turns from "0" into "1", and pulse signal $S_{RES}$ follows to become "1" in logic in response. After moment t1, the first subsequent rising edge of clock signal CLK accordingly turns ON controllable current source 206 to make offset current $I_{OS}$ appear, having a constant positive value of IOS.

The appearing of offset current $I_{OS}$ drops input voltage $V_{HV}$ and fraction result $V_{BNO}$ quickly because offset current $I_{OS}$ goes through current-limiting resistor 20. The drop of fraction result $V_{BNO}$ will be about K*IOS*RHV, where RHV is the resistance of current-limiting resistor 20. Fraction result $V_{BNO}$, therefore, could go down below reference voltage $V_{REF}$ to turn comparison result $S_{CHK}$ into "0" in logic, pulse signal $S_{RES}$ becomes "0", control circuit 224 in response turns OFF controllable current source 206, and offset current $I_{OS}$ ends immediately. This analysis implies the appearing of offset current $I_{OS}$ could cause automatic shutdown of itself via a feedback path. As shown in FIG. 4, because of the feedback path, offset current $I_{OS}$, once triggered, only lasts for a very short period of time before it ends.

The shutdown of offset current $I_{OS}$ makes the drop of fraction result $V_{BNO}$ disappear, fraction result $V_{BNO}$ recovers, so comparison result $S_{CHK}$ turns from "0" into "1" in logic. As detailed before, offset current $I_{OS}$ will reappear when another subsequent rising edge of clock signal CLK reaches D flip-flop 240, and once again offset current $I_{OS}$ will last for only a very short period of time before it ends. In other words, offset current $I_{OS}$ appears periodically and lasts only for a very short period of time each time when clock signal CLK has a rising edge.

At moment t2, line voltage $V_{LINE}$ is equal to upper limit voltage $V_{TOP}$. As shown during the period of time from moment t1 to moment t2 in FIG. 4, line voltage $V_{LINE}$ is between upper limit voltage $V_{TOP}$ and lower limit voltage $V_{BTM}$, offset current $I_{OS}$ appears each time when clock signal CLK has a rising edge, but offset current $I_{OS}$ disappears automatically soon after it appears.

Since moment t2, line voltage $V_{LINE}$ has exceeded upper limit voltage $V_{TOP}$ and is not within the predetermined range RG. Since then, no matter whether offset current $I_{OS}$ appears or not, fraction result $V_{BNO}$ is larger than reference voltage $V_{REF}$, and comparison result $S_{CHK}$ is always "1" in logic. Pulse signal $S_{RES}$ is going to have a pulse with a pulse width of debounce-time $T_{DEB1}$ defined by debouncing circuit 230, which is 300 us for example. During the pulse of pulse signal $S_{RES}$, the appearing or shutdown of offset current $I_{OS}$ is solely controlled by clock signal CLK, meaning that offset current $I_{OS}$ appears if clock signal CLK is "1" and that it disappears if clock signal CLK is "0". This circuit behavior is illustrated by the signal waveforms in FIG. 4 during the period of time from moment t2 to moment t3.

When comparison result $S_{CHK}$ has continued to be "1" for debounce-time $T_{DEB1}$, debouncing circuit 230 turns acknowledgement signal $S_{BI}$ from "0" into "1" in logic, the pulse of pulse signal $S_{RES}$ concludes, so offset current $I_{OS}$ disappears or shuts down constantly, as shown at moment t3 in FIG. 4.

As demonstrated in FIG. 4 from moment t2 to moment t3, offset current $I_{OS}$ appears or disappears in response to the change in logic value of clock signal CLK. More particularly, offset current $I_{OS}$ appears if clock signal CLK is "1". To reduce the power consumption caused by the appearance of offset current $I_{OS}$, the duty cycle of clock signal CLK, the ratio of the time when clock signal CLK is logic "1" to the cycle time of clock signal CLK, could be 10% or less.

In the right half of FIG. 4, comparison result $S_{CHK}$ is stable to be "0" after moment t4 when line voltage $V_{LINE}$ ramps down below lower limit voltage $V_{BTM}$. So debounce-time $T_{DEB2}$ after t4, enabling signal EN turns from "1" into "0" to disenable signal generator 212.

Based on the analysis in view of FIGS. 3 and 4, both comparator 220 comparing fraction result $V_{BNO}$ with reference voltage $V_{REF}$ and controllable current source 206 providing offset current $I_{OS}$ work together to check whether line voltage $V_{LINE}$ falls within predetermined range RG. Furthermore, if line voltage $V_{LINE}$ is outside predetermined range RG, offset current $I_{OS}$ disappears or shuts down eventually; and if line voltage $V_{LINE}$ is within predetermined range RG, it appears periodically and each of its appearance only lasts for a very short time period. It implies good power saving because offset current $I_{OS}$ is turned OFF most of time.

The above analysis can witness that upper limit voltage $V_{TO}p$ and lower limit voltage $V_{BTM}$ comply with the following equations (1) and (2) respectively.

$$K*(V_{TOP}-RHV*IOS)=V_{REF} \quad (1)$$

$$K*V_{BTM}=V_{REF} \quad (2)$$

Equation (1) clearly indicates that upper limit voltage $V_{TO}p$ is in association with resistance RHV of current-limiting resistor 20. Even though value IOS and reference voltage $V_{REF}$ are both predetermined values that cannot be changed once power controller 18c is fabricated in form of an integrated circuit, a system designer nevertheless can choose current-limiting resistor 20 with appropriate resistance RHV to modify upper limit voltage $V_{TOP}$. Bottom limit voltage $V_{BTM}$ is substantially independent to current-limiting resistor 20 however. Bottom limit voltage $V_{BTM}$ is unchangeable since it depends primarily on reference voltage $V_{REF}$ and K, two default factors in an integrated circuit.

According to embodiments of the invention, upper limit voltage $V_{TOP}$ is used to be the brown-in reference for brown-in mechanism, and it is adjustable by choosing current-limiting resistor 20. When line voltage $V_{LINE}$ has been steady above upper limit voltage $V_{TOP}$ acknowledgement signal $S_{BI}$ becomes "1" in logic and brown-in mechanism circuit 210 enables signal generator 212, which according generates PWM signal $S_{PWM}$ to start power conversion of a power supply.

Bottom limit voltage $V_{BTM}$ is used to be the brown-out reference for brown-out protection, and it cannot be adjusted when the integrated circuit of power controller 18c completes its fabrication. When line voltage $V_{LINE}$ has been steady under bottom limit voltage $V_{BTM}$ for more than 180 ms, output of debouncing circuit 209 becomes "1" in logic, so SR flip-flop 213 is reset to disenable signal generator 212, thereby stopping power conversion of a power supply.

The embodiment in FIG. 3 uses upper limit voltage $V_{TOP}$ and bottom limit voltage $V_{BTM}$ as brown-in and brown-out references respectively, but this invention is not limited to. Other embodiments of the invention could for example use upper limit voltage $V_{TOP}$ to be both brown-in and brown-out references. For example, some embodiments of the invention could leave out brown-in mechanism circuit 210 and brown-out protection circuit 208 in FIG. 3, and take acknowledgement signal $S_{BI}$ as enabling signal EN to enable or disable signal generator 212.

Figure 5:
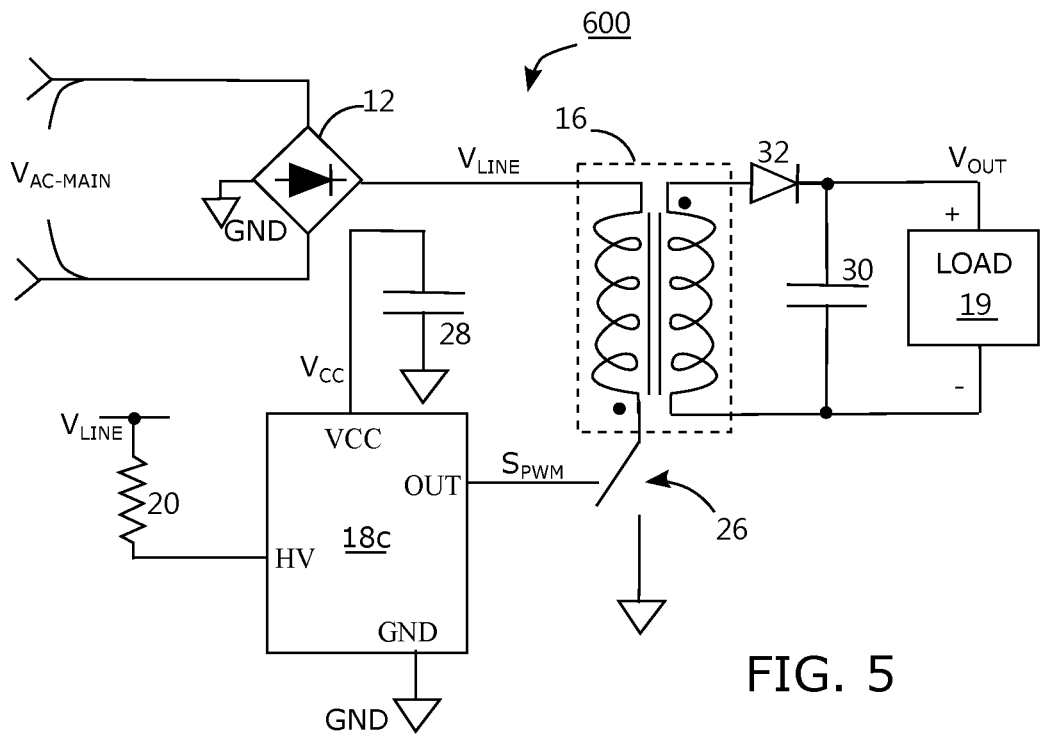
FIG. 5 demonstrates another AC-to-DC power supply according to embodiments of the invention.

FIG. 5 demonstrates another AC-to-DC power supply 600 with a flyback topology. AC-to-DC power supply 600 has high-voltage startup and employs power controller 18c of FIG. 3. FIG. 5 lacks the diodes 14 in FIG. 4, and the line voltage $V_{LINE}$ in FIG. 5 is provided from bridge rectifier 12.

Even though this invention is detailed by way of AC-to-DC flyback power supplies, but it is not limited to however. Embodiments of the invention could include boosters, buck converters, buck boosters, and so forth.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A line-voltage detection method for a power controller with a high-voltage node connected via a current-limiting resistor to a line voltage generated by rectifying an alternating-current input voltage, wherein the power controller includes a high-voltage startup transistor, the line-voltage detection method comprising:
    dividing a first input voltage at the high-voltage node to provide a fraction result;
    providing an offset current flowing through the high-voltage startup transistor and the current-limiting resistor in response to the fraction result; and
    stopping the offset current in response to the fraction result when the offset current flows through the high-voltage startup transistor and the current-limiting resistor.

2. The line-voltage detection method as claimed in claim 1, comprising:
    comparing the fraction result with a reference voltage, so as to determine whether to provide or stop the offset current.

3. The line-voltage detection method as claimed in claim 1, comprising:
    stopping the offset current eventually if the line voltage is outside a predetermined range between an upper limit voltage and a lower limit voltage;
    wherein the upper limit voltage is higher than the lower limit voltage.

4. The line-voltage detection method as claimed in claim 3, wherein the upper limit voltage is in association with the current-limiting resistor.

5. The line-voltage detection method as claimed in claim 3, comprising:
    periodically stopping and providing the offset current when the line voltage is within the predetermined range.

6. The line-voltage detection method as claimed in claim 5, comprising:
    providing a clock signal; and
    periodically providing the offset current in response to the clock signal when the line voltage is within the predetermined range.

7. The line-voltage detection method as claimed in claim 1, comprising:
    providing a charging current flowing from the line voltage, through the high-voltage startup transistor, so as to charge an operating voltage capacitor.

8. A power controller with brown-in mechanism, comprising:
    a high-voltage node, connected to a line voltage via a current-limiting resistor;
    a high-voltage startup transistor connected between an operating voltage capacitor, for providing a charging current flowing through the high-voltage startup transistor to charge the operating voltage capacitor;
    a controllable current source configured for pulling an offset current;
    a voltage divider for providing a fraction result of an input voltage at the high-voltage node;
    a management circuit for controlling the controllable current source in response to the fraction result, thereby optionally providing the offset current flowing through the current-limiting resistor and the high-voltage startup transistor;
    a signal generator for providing a PWM signal to a power switch; and
    a brown-in mechanism circuit coupled to enable the signal generator in response to the fraction result.

9. The power controller as claimed in claim 8, wherein the management circuit comprises:
    a comparator for comparing the fraction result with a reference voltage to provide a comparison result;
    a single pulse generator for providing a pulse signal in response to the comparison result; and
    a control circuit for turning ON the controllable current source when the pulse signal appears.

10. The power controller as claimed in claim 9, wherein the control circuit receives a clock signal, and turns ON the controllable current source when a signal edge of the clock signal appears.

11. The power controller as claimed in claim 9, wherein the single pulse generator comprises:
    a debouncing circuit for passing the comparison result to be an acknowledgement signal if the comparison result has been stable at a first logic value for a predetermined debounce-time; and
    a logic circuit for generating the pulse signal in response to the acknowledgement signal and the comparison result;
    wherein the brown-in mechanism circuit coupled to enable the signal generator in response to the acknowledgement signal.

12. The power controller as claimed in claim 9, comprising:
    a brown-out protection circuit coupled to disenable the signal generator when the comparison result has been stable at a logic value for a predetermined debounce-time.

13. A power supply with brown-in mechanism, comprising:
    a current-limiting resistor;
    a power switch;
    an operating voltage capacitor; and
    a power controller, in form of an integrated circuit, comprising:
        a high-voltage node, as a first pin of the integrated circuit, connected to a line voltage via the current-limiting resistor;
        an operating voltage source node, as a second pin of the integrated circuit, wherein the operating voltage capacitor is connected to the operating voltage source node;
        a high-voltage startup transistor connected between the operating voltage source node and the high-voltage node, for providing a charging current flowing through the high-voltage startup transistor to charge the operating voltage capacitor;

a management circuit coupled to detect an input voltage at the high-voltage node; and a signal generator coupled to the management circuit for providing a PWM signal to the power switch;

wherein when the line voltage exceeds an upper limit voltage the signal generator is enabled to provide the PWM signal, thereby performing brown-in mechanism; and the upper limit voltage is in association with resistance of the current-limiting resistor.

14. The power supply as claimed in claim 13, wherein when the line voltage goes below a lower limit voltage the signal generator is disenabled to stop providing the PWM signal, thereby performing brown-out protection, the lower limit voltage is less than the upper limit voltage, and a difference between the upper and lower limit voltages is in association with the resistance of the current-limiting resistor.

15. The power supply as claimed in claim 14, wherein the power controller comprises:

a controllable current source configured for pulling an offset current;

wherein when the line voltage is within a range defined between the upper and lower limit voltages the management circuit turns ON and OFF the controllable current source periodically; and the offset current, when the controllable current source is turned ON, flows from the line voltage, through the current-limiting resistor and the high-voltage startup transistor.

16. The power supply as claimed in claim 15, wherein the management circuit turns OFF the controllable current source eventually if the line voltage is outside the range.

17. The power supply as claimed in claim 14, wherein the lower limit voltage is substantially independent to the current-limiting resistor.

18. The power supply as claimed in claim 13, wherein the power controller comprises:

a voltage divider for providing a fraction result of the input voltage at the high-voltage node;

wherein the management circuit compares the fraction result with a reference voltage to provide a comparison result.

19. The power supply as claimed in claim 18, wherein the management circuit comprises:

a single pulse generator for providing a pulse signal in response to the comparison result;

wherein the single pulse generator is coupled to control a controllable current source pulling an offset current flowing through the current-limiting resistor and the high-voltage startup transistor.

20. The power supply as claimed in claim 18, wherein the power controller comprises:

a brown-in mechanism circuit coupled to enable the signal generator in response to the comparison result.

* * * * *